Figure 1:
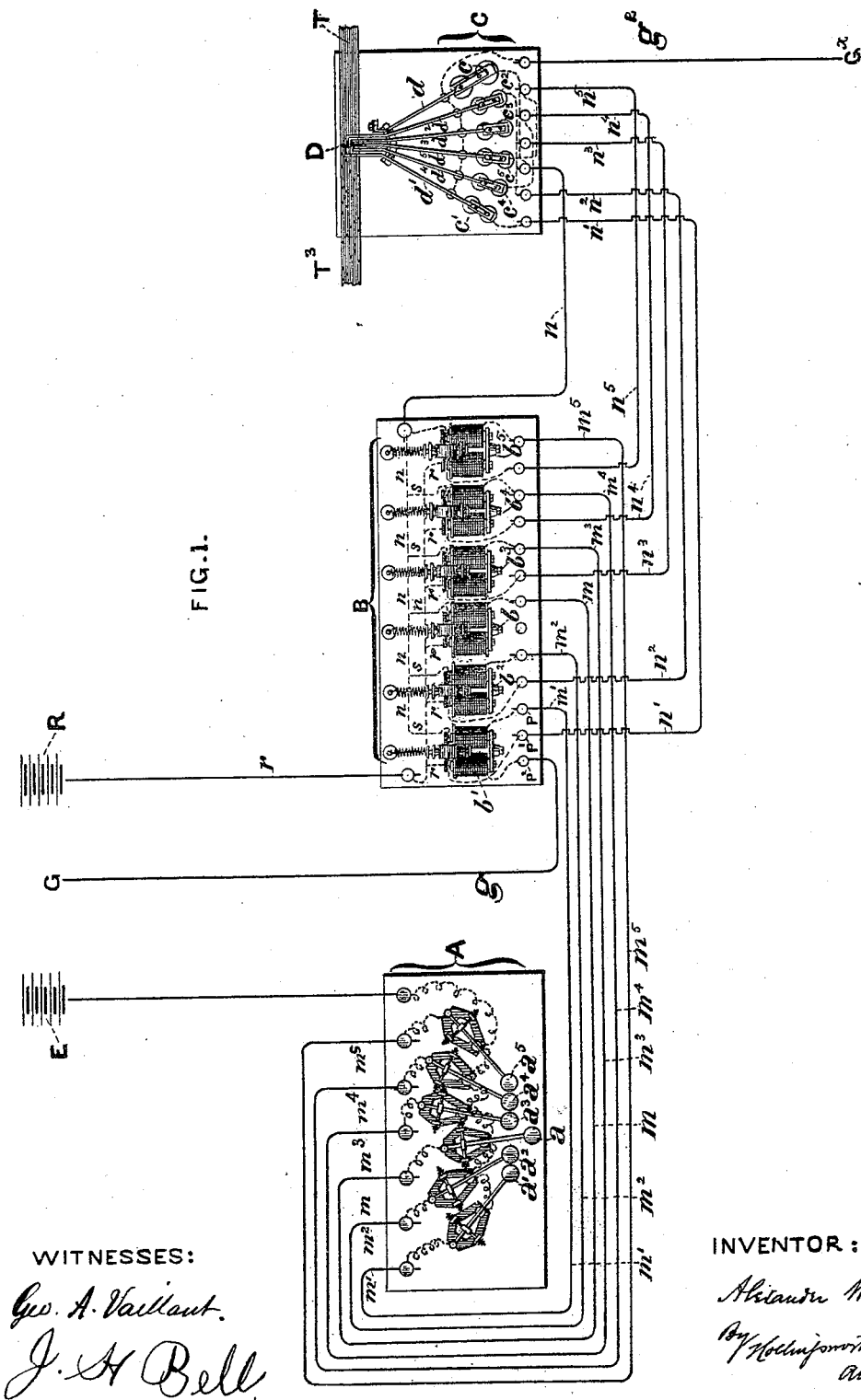

(No Model.) 4 Sheets—Sheet 1.

A. WOOD.
STENO-TELEGRAPHIC APPARATUS.

No. 460,619. Patented Oct. 6, 1891.

WITNESSES:
Geo. A. Vaillant.
J. H. Bell.

INVENTOR:
Alexander Wood
By Hollingsworth & Roby
Attorneys

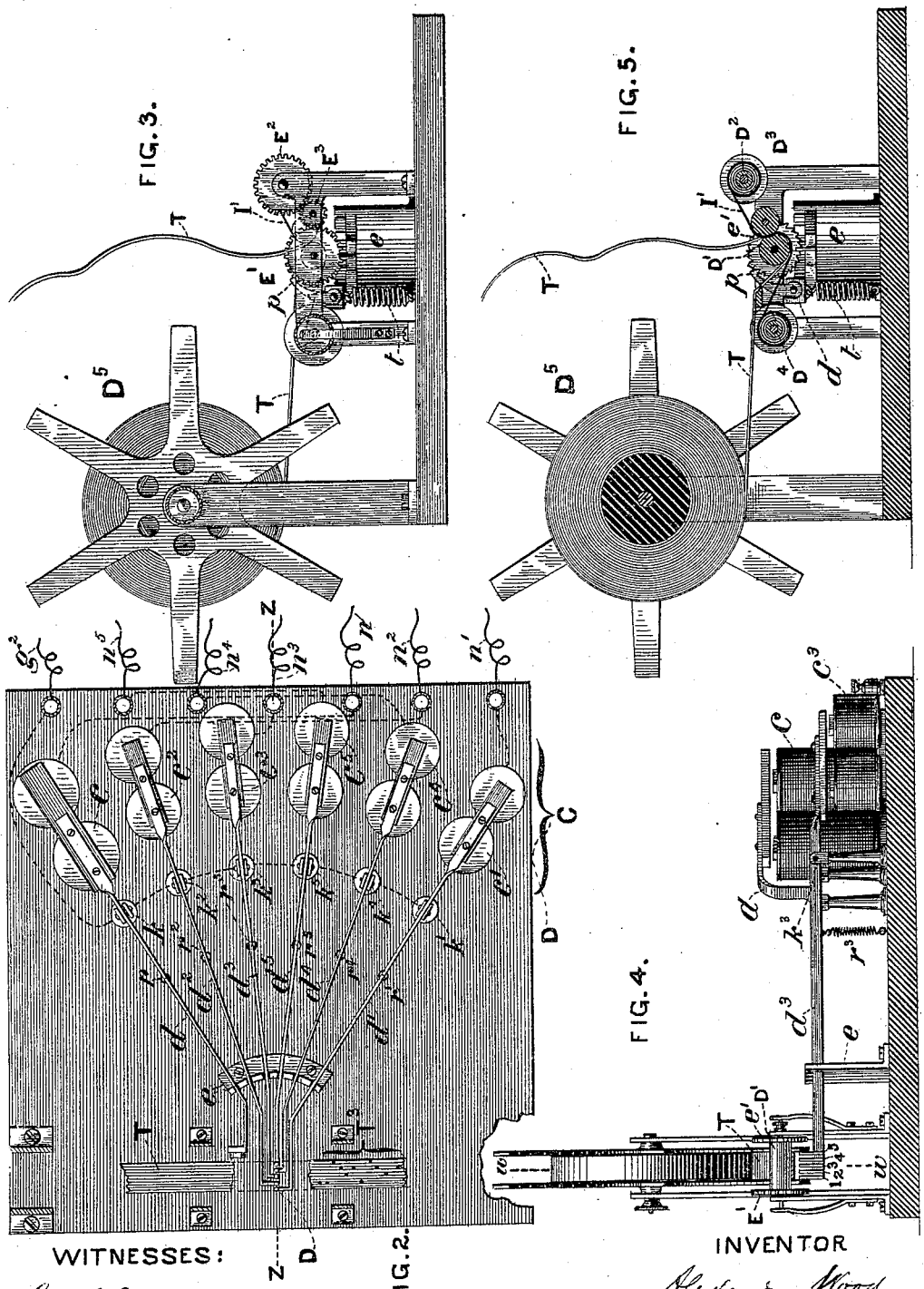

(No Model.) 4 Sheets—Sheet 3.
A. WOOD.
STENO-TELEGRAPHIC APPARATUS.
No. 460,619. Patented Oct. 6, 1891.
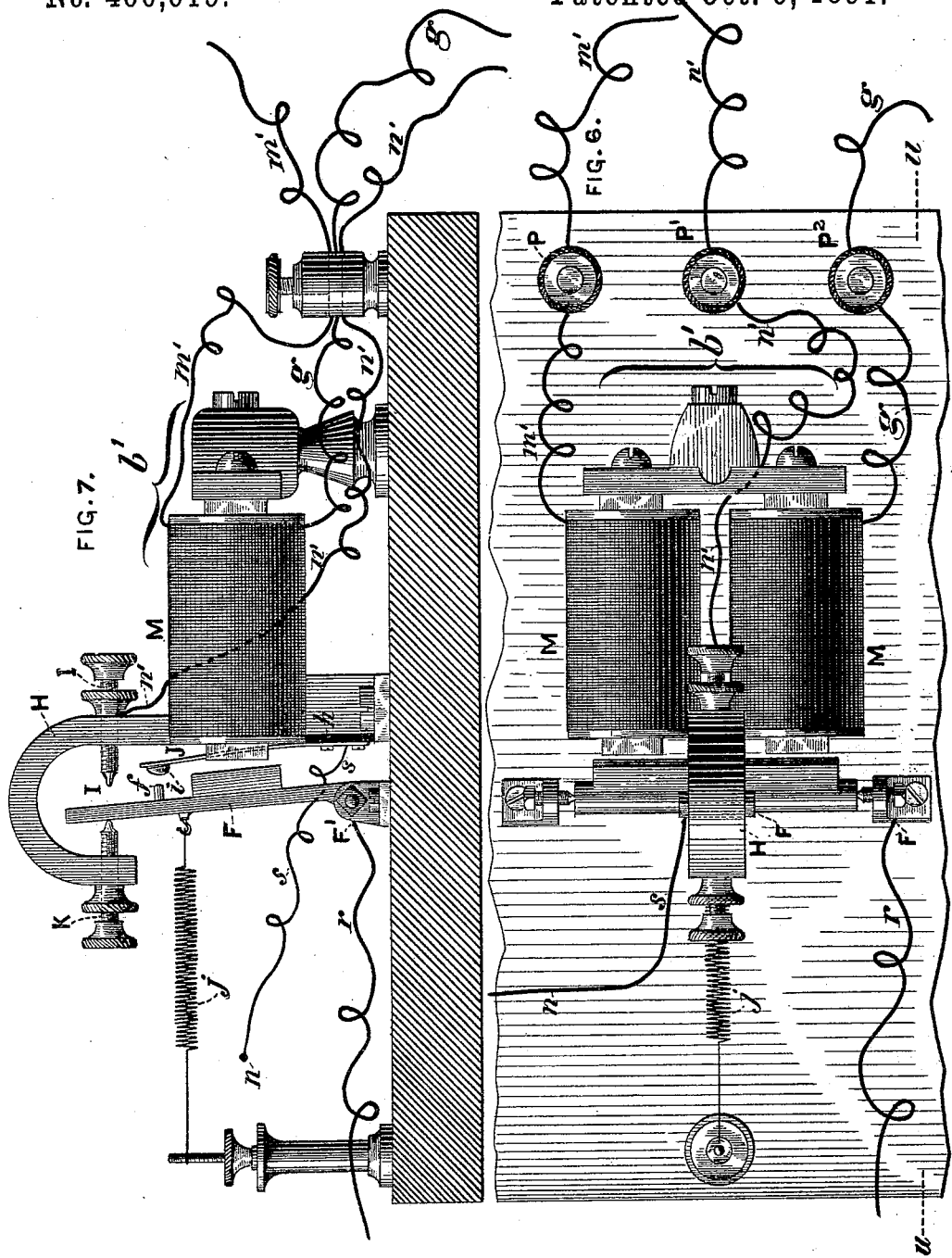
WITNESSES:
Geo. A. Vaillant.
J. H. Bell.
INVENTOR:
Alexander Wood
By Hollingsworth & Haley
Attorneys (No Model.) 4 Sheets—Sheet 4.
A. WOOD.
STENO-TELEGRAPHIC APPARATUS.
No. 460,619. Patented Oct. 6, 1891.
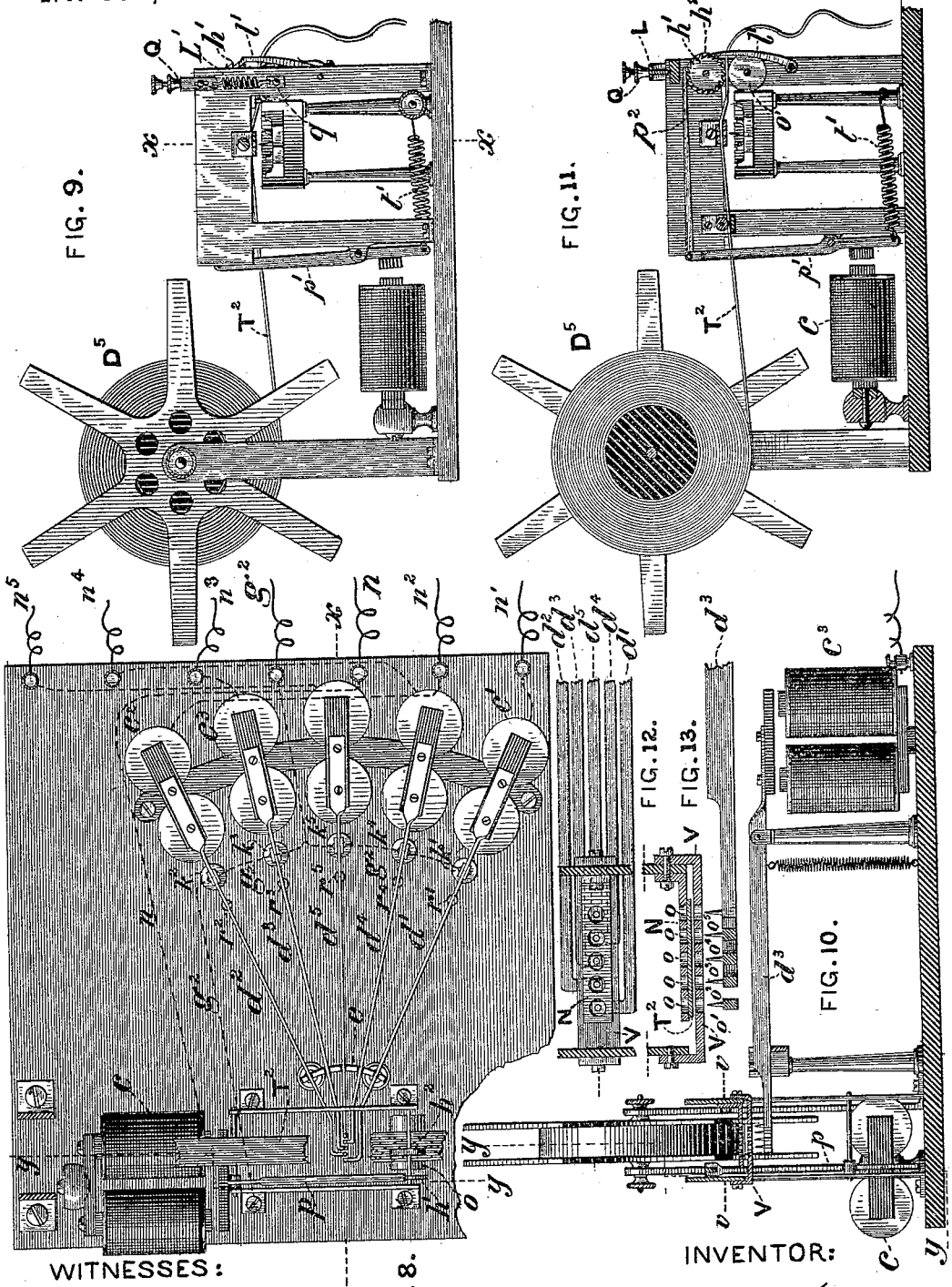
WITNESSES:
Geo. A. Vaillant.
J. H. Bell
INVENTOR:
Alexander Wood,
By Hollingsworth & _____
Attorneys.

UNITED STATES PATENT OFFICE.

ALEXANDER WOOD, OF PHILADELPHIA, PENNSYLVANIA.

STENO-TELEGRAPHIC APPARATUS.

SPECIFICATION forming part of Letters Patent No. 460,619, dated October 6, 1891.

Application filed December 7, 1886. Serial No. 220,892. (No model.)

*To all whom it may concern:*

Be it known that I, ALEXANDER WOOD, of Philadelphia, in the State of Pennsylvania, have invented certain new and useful Improvements in Steno-Telegraphic Apparatus, whereof the following is a specification, reference being had to the accompanying drawings.

In said drawings, Figure 1, Sheet I, represents a general view of a steno-telegraphic system embodying my improvements, comprising both the transmitting and receiving ends of the line. Sheet II shows, on an enlarged scale, one form of recording apparatus, Fig. 2 being a partial top or plan view thereof, Fig. 3 a rear elevation, Fig. 4 a vertical section on the line $z\,z$ of Fig. 2, and Fig. 5 being a vertical section on the line $w\,w$ of Fig. 4. Sheet III shows, on a still more enlarged scale, the details of the relay system used at the recording end, Fig. 6 being a top or plan view of one of the relay-magnets, and Fig. 7 a vertical section on the line $u\,u$ of Fig. 6. Sheet IV shows a modified arrangement of the recording apparatus, which may be substituted for that shown on Sheet III, Fig. 8 being a partial top or plan view of such modifications, Fig. 9 a partial end elevation thereof, Fig. 10 a vertical section on the line $x\,x$ of Fig. 8, and Fig. 11 a vertical section on the line $y\,y$ of Fig. 10. Figs. 12 and 13 are partial sectional views, on a much enlarged scale, showing the details of the recording stylus or marker, the section-line of Fig. 12 being indicated by $v\,v$ in Fig. 10 and that of Fig. 13 being $x\,x$ in Fig. 8.

In the modified arrangement shown on Sheet IV many of the parts exactly correspond to those of the other arrangement, and in such cases they are indicated by the same letters of reference; but to avoid confusion the entire system will first be described by reference only to Sheets I, II, and III, so that for the present Sheet IV should be disregarded.

The objects of my invention are to simplify the entire system by reducing the number of parts to a minimum and to insure the positive action of the recording devices.

In the system shown in the accompanying drawings the stenographic characters consist in the various groups derivable from a number of dots arranged in a straight line across a tape or ribbon of paper, each of said dots being produced by a marker operated through its own line wire and key. I have found that by using five markers a sufficient number of groups can be obtained for necessary signs, such as the letters of the alphabet, &c. In addition to the five marking devices I use a spacing device for advancing the paper, having its own key at the transmitting end for independent operation, but also arranged to be operated automatically immediately after the printing of each character. This automatic spacing device forms one of the prominent features of my invention, in that while its action is initiated by the movement transmitted to the markers it is effected positively by separate means. Hence the spacing apparatus does not drag upon the remainder, but operates with certainty and efficiency.

Referring now to Fig. 1, Sheet I, for the entire system, A represents the group of keys, (which may be of any ordinary form,) six in number, $a$ being the key for operating independently the spacing device, and $a'\,a^2\,a^3\,a^4\,a^5$ the remaining keys, which operate the markers. The keys have independent wires, represented by $m,\,m',\,m^2,\,m^3,\,m^4,$ and $m^5$, respectively.

To avoid prolixity of description I will, where the parts shown are merely repetitions, describe one set only, and use for the others similar reference-letters with numerals corresponding throughout. Thus all parts of the set proceeding from key $a'$ will be found to have the numeral 1 affixed, and so on through the remaining numerals. The battery at the transmitting end is indicated by E, and its ground connection at the other end by G. At the receiving end B represents a group of relay-magnets; R, a relay-battery having a ground connection $G^\times$; C, the group of magnets which operate the marking and spacing devices, (which, for convenience, I call the "marker" and "spacer" magnets,) and D the group of marking and spacing devices themselves.

Following out the set of devices which depend upon key $a'$, it will be observed that its wire $m'$ leads to the relay-magnet $b'$, and that thence a relay-wire $n'$ leads to the marker-magnet $c'$ of the group C, said magnet $c'$ having its own marking-lever arm $d'$. It will also be seen that for each of the relay-magnets in the group B a connection $s$ is provided, which is in circuit with the relay-wire $n$ belonging to the relay-magnet $b$. This relay $b$ is the relay of the spacing-key $a$, and its relay-wire $n$ leads to the spacer-magnet $c$, (enlarged in the drawings for the sake of distinction,) which operates the independent spacing device. Therefore, assuming for the present that the group C contains five marker-magnets and a spacer-magnet, all capable of being operated by relay, five members of the relay-group B can operate not only their respective marker-magnets, but the spacer-magnet also, and the sixth member of group B—viz., the relay $b$ and wire $n$—operates the spacer-magnet alone. Before proceeding to describe the peculiar construction of the relay system, which enables the members to perform this double function, I will describe the details of the marking and spacing devices.

Fig. 2, Sheet II, shows the general plan of the group, five of whose members are substantially alike. The magnet $c'$ has a vertically-moving lever-arm $d'$ (which I term the "marking-arm") pivoted at $k'$ and normally held down by a spring $r'$. The marking-arm $d'$ extends through a guide-slot in the plate $e$ and terminates in a vertical stylus or type 1. The several marking-arms $d'$ $d^2$, &c., comprising the group, are radially arranged and are so bent at their ends as to bring all the types 1 2 3 4 5 into a line, as shown clearly in Fig. 2.

Referring now to the elevations shown in Figs. 3 and 5, it will be seen that the types 1, 2, 3, 4, and 5 are in line beneath the periphery of a roller $D'$, upon one end of which is mounted a ratchet-wheel $e'$, having a pawl $p$, attached to the lever-arm $d$ of the spacer-magnet $c$, and provided also with a spring $t$. The lever-arm $d$ of the spacer-magnet $c$ is like the other or marking-arms of the group, except that its end is connected with the pawl $p$ instead of terminating in a type or stylus, and I term it the "spacing-arm." When this spacing-arm $d$ is actuated by its magnet $c$, the pawl $p$ is raised, so as to advance upon the ratchet-wheel $e'$, and upon the release of the spacing-arm by its magnet the spring $t$ draws the pawl $p$ downward, thus rotating the ratchet-wheel $e'$ and its cylinder $D'$. Upon the other end of the cylinder $D'$ is mounted a gear-wheel $E'$, which drives, by means of a pinion $E^3$, a gear $E^2$, connected with a roller $D^2$, which is therefore rotated in correspondence with the roller $D'$. At convenient points upon the frame are mounted the rollers $D^3$ and $D^4$, the former of which bears lightly against the periphery of the roller $D'$ and the latter of which has coiled upon it a quantity of inking-ribbon $I'$, like that commonly used in type-writing machines. The paper ribbon or tape T, upon which the characters are to be impressed, is coiled upon a reel $D^4$ and, together with the inking-ribbon $I'$, is carried around the under side of the roller $D'$, and thence over the roller $D^3$ to the winding-up roller $D^2$. It will be thus seen that by the separate or conjoint action of any number of the marker-magnets $c'$ $c^2$ $c^3$ $c^4$ $c^5$ their respective marking-arms $d'$ $d^2$ $d^3$ $d^4$ $d^5$ can be caused to print dots across the tape T in such groups as may be desired. Furthermore, assuming that by a proper device at the relay group a current is transmitted to the spacer-magnet each time that any one of the marker-magnets is energized, and that said current continues throughout the period of action of the marker-magnet, it will be seen that with the printing of each character the spacing-arm will move upon the pawl $p$ forward upon the ratchet $e'$ and as soon as the type has left the paper by the cessation of the current in its marker-magnet the spacer-magnet will let go the spacing-lever $d$, so that the spring $t$ can retract it. Upon each retraction of the spacing-arm $d$ the rollers $D'$ and $D^2$ will be rotated, so as to feed the paper T forward to an extent determined by the range of movement of the spacing-arm $d$ and pawl $p$ relatively to the periphery of the ratchet-wheel $e'$.

In Fig. 2 the appearance of the tape after being printed upon is shown at $T^3$, and the stenographic characters can be arbitrarily determined by the numbers and relative positions of the dots across the paper.

From the foregoing description of the printing or marking apparatus it is obvious that a feed movement of the spacing-arm must occur immediately after each impression, and that where the end of a word or sentence is to occur the spacing-arm must be capable of an independent feed movement to produce an extra space or break. The devices which permit this twofold action of the spacing-arm, and which not only insure its efficiency, but also its relation to the marking movements, are shown in Figs. 6 and 7, Sheet III. Here the relay-magnet $b'$ is illustrated upon a much enlarged scale, and, for the purposes of clearness, the different wires leading to and from it are not concealed, as they would be in practice, by insertion in convenient portions of the base.

Referring to the plan view of Fig. 6, it will be seen that the wire $m'$ from the signal-key $a'$ leads through a binding-post P to the relay-magnet, whose coils are represented by M M, the ground-wire $g$ leading off therefrom on the opposite side. An overhanging standard H is mounted between the coils of the magnet, and is provided with set-screws K I, which serve to regulate the throw of the pivoted armature F, the screw I being also arranged to act as a point of contact for a current flowing through the armature F in the manner common in systems. The wire $r$ from the relay-battery is connected with this armature at $F'$, and the wire $n'$, which leads to the marker-magnet $c'$ of this particular relay, is in metallic connection with the screw I, which makes the contact with the armature F when the relay is operated. Mounted upon the side of the standard H and insulated therefrom by a piece of hard rubber or other material $h$ is a spring contact-piece J, having near its free upper end a metallic button or contact-point $i$, and opposite to this point $i$ a pin $f$ projects from the armature F. The length of this pin $f$ and the forward projection of the spring contact-pieces J is such that contact between the points $f$ and $i$ will occur a moment before the contact between the armature F and the screw I is made, and similarly upon the return of the armature F to its normal position (which is effected by a spring $j$) the circuit will be broken between the armature F and the set-screw I before it is broken at $f$ and $i$. From the base of the spring J the wire $s$ leads to the wire $n$, which communicates with the spacer-magnet $c$. When, therefore, the relay-magnet $b'$ is operated by its key $a'$, the armature F is attracted and the relay-circuit is first established between the contact-points $f$ and $i$, sending a current through the wire $n$ to the spacer-magnet $c$. This actuates the spacing-arm $d$ and throws the pawl $p$ forward upon the ratchet-wheel $l$, holding it there. Almost immediately, however, upon the making of this contact the circuit is closed at the upper end of the armature F by contact with the set-screw I, thus sending a branch of the relay-current through the wire $n'$ to the marker-magnet $c'$. The marking-arm $d'$ is thereby actuated, and a dot is made upon the paper T. When the operator releases the key $a'$, the armature F returns to its original position and breaks the circuit with the screw I, whereupon the marking-arm $d'$ returns to its normal position, so that the type no longer presses upon the paper. Immediately afterward the other circuit is broken by the withdrawal of the pin $f$ from the contact $i$, so that the current no longer passes to the spacing-magnet $c$. The spacing-arm $d$, being thus released, the spring $t$ draws it, together with the pawl $p$, downward, and by rotating the rollers D' D² feeds the paper forward one space. As before stated, any number of the marking-arms can be simultaneously actuated in the same manner, and with the movement of any one or of the whole group the movement of the spacing-arm $d$ will also occur, because each one of the relay-magnets (except the magnet $b$) is provided with the system of double contacts above described and with a wire $s$, which leads from the advance contact to the spacer-magnet $c$. The relay $b$ of the spacing-key $a$ is not provided with such an advance contact, because it is only intended to transmit a current to the spacer-magnet $c$, and hence one contact is sufficient. The armature of the relay $b$, therefore, is simply arranged to make one contact at a point which is in circuit with the wire $n$, leading to the spacing-magnet $c$. Thus when the spacing-key $a$ is depressed it only operates the spacer-magnet $c$, the printing-magnets remaining quiescent.

Having thus described one form of printing apparatus, I will now proceed, by reference to Sheet IV, to describe a modification thereof which dispenses with the inking-tape and its rollers and which substitutes therefor points or needles to penetrate the paper, the holes taking the place of the printed dots.

Referring to Fig. 8, it will be seen from the plan view that the marker-magnets and their arms are arranged as before; but the spacer-magnet (indicated by $c$) is placed in a different position and has a different arrangement for actuating the feed-roller. The armature of the spacer-magnet $c$ is mounted upon the lower end of a lever-arm $p'$, provided with a spring $t'$ for retracting it from the magnet. The upper end of the lever-arm $p'$ is attached to a pawl-bar $p^2$, which engages with a ratchet $h'$, mounted upon the feed-roller $h^2$. A spring-stop $l'$ prevents the rotation of the ratchet-wheel in the wrong direction. Beneath the roller $h^2$ is a second roller O, bearing against its under surface and mounted in sliding journals $q$, which are supported upon springs L', Fig. 9, attached to an adjustable cross-yoke L, having a set-screw Q for regulating the degree of pressure with which the holder O bears against the feed-roller $h^2$. The tape or ribbon of paper $T^2$ passes from its reel $D^5$ between two guiding-strips of metal V N, which are arranged above the ends of the marking-arms $d'$, &c. These marking ends of the arms are provided with sharp points $o'$, $o^2$, $o^3$, $o^4$, and $o^5$, as shown clearly in the enlarged views, Figs. 12 and 13, and the guide-strips V and N are perforated with holes $o$ above each one of the marking-points. Thus upon the actuating of the marking-arms $d'$, &c., the points $o'$, &c., will be driven up through the paper, which, being retained in position by the guide-strips V and N, will not slip nor shift, and as the circuit of the marker-magnets $c'$, &c., is broken before that of the spacer-magnet $c$ the point, $o'$, &c., will be completely withdrawn from the paper before the release of the spacing-arm $p'$ from the spacer-magnet $c$ allows the spring $t'$ to draw it away and actuate the ratchet-wheel $h'$. The feed, therefore, in this instance also occurs immediately after the marking has taken place.

In the system just described the spacer-magnet $c$ is of course capable of independent operation through its own relay-magnet, as before, and the only difference between the alternative methods of construction shown on Sheets II and IV lies in the fact that the one prints by the means of an inking-tape, while the other perforates the paper, the changes in mechanism being only such as the necessities of the respective systems require.

Should the line be so short as not to require the use of a relay, the double contact for producing the proper sequence of action of the marker and spacer magnets can of course be made at the key instead of at the relay-magnet; but apart from the general necessity of a relay system I have found this to be a less satisfactory method of producing the two contacts than the one above specified.

In the foregoing description I have used the term "advance contact" as most conveniently indicating the character of the device for producing the proper sequence in the movements of the marking and spacing arms. It is proper to observe, however, that the delayed break of the spacer-magnet circuit is really the condition upon which this described action depends, and since modifications of the device for effecting such successive action will readily occur to an expert I do not desire to limit my claim to either the advance contact or the delayed break as the essential feature.

I claim in steno-telegraphic apparatus the following combinations:

The combination of a battery at the transmitting end of the line, a group of independent circuits leading thence to the receiving end of the line, a group of keys controlling said independent circuits, a group of marker-magnets and a spacer-magnet at the receiving end of the line, a group of marking-arms and a spacing-arm in operative relation to said magnets, respectively, a recording-ribbon arranged substantially as described with relation to the marking-arms, spacing mechanism, substantially as described, for advancing said ribbon longitudinally, said spacing mechanism being operatively connected with the spacer-arm, a group of relay-circuits and relay-magnets at the receiving end of the line arranged in operative relation with the main circuits for the marker-arms, armatures for said relay-magnets, a pair of contact-pieces operatively connected with each of said armatures and having different ranges of movement, one of each pair of contact-pieces controlling a relay-circuit of a marker-magnet, a spacer relay-magnet and relay-circuit operatively connected with the main spacer-circuit, and a group of circuits at the receiving end operatively connected with the spacer-magnet and controlled, respectively, by a second member of each pair of said contact-pieces, substantially as set forth, whereby when the spacer-magnet is operated through the marker-circuits the opening of the spacer-circuit is delayed beyond the opening of the marker-circuit.

A. WOOD.

Witnesses:
CHAS. F. VAN HORN,
J. H. BELL.